March 12, 1935.  L. L. SCHAUER  1,994,040
COMBINED ARM AND SUMP
Filed Dec. 24, 1931  3 Sheets-Sheet 1

Inventor
Lawrence Lee Schauer
By Attorneys
Nathan, Bowman & Helfrich

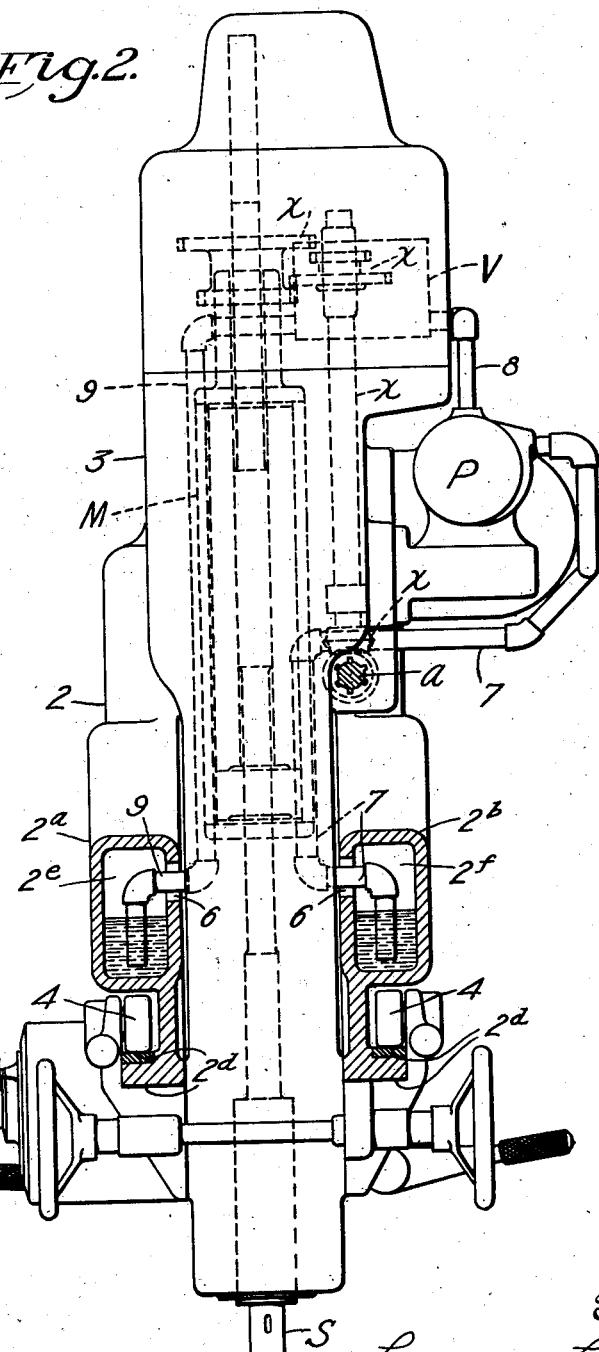

March 12, 1935.  L. L. SCHAUER  1,994,040
COMBINED ARM AND SUMP
Filed Dec. 24, 1931   3 Sheets-Sheet 3
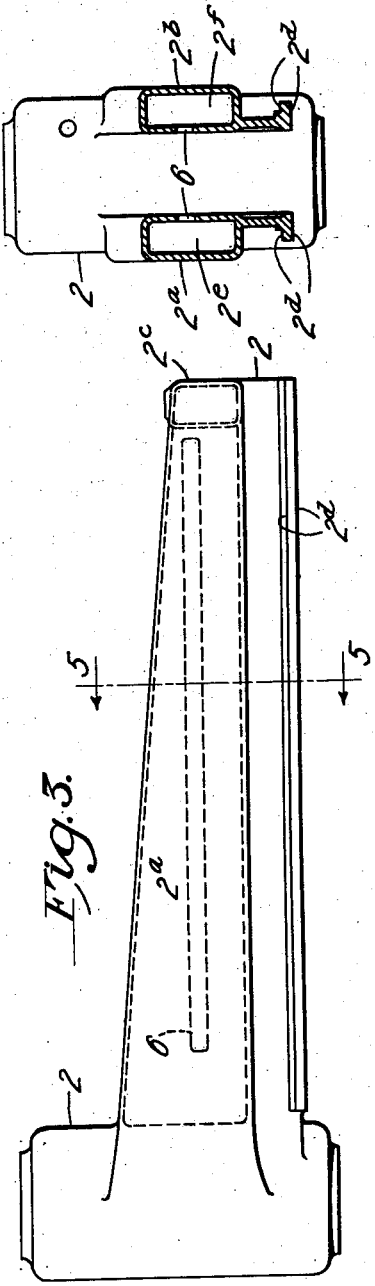
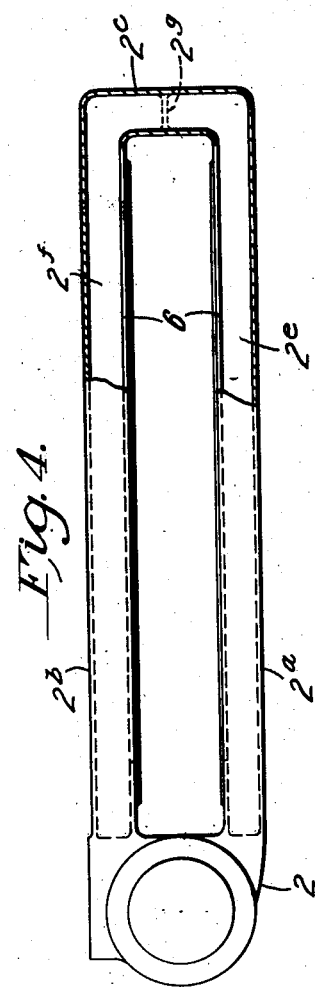

Patented Mar. 12, 1935

1,994,040

UNITED STATES PATENT OFFICE 1,994,040

COMBINED ARM AND SUMP

Lawrence Lee Schauer, Cincinnati, Ohio, assignor to The Cincinnati Bickford Tool Company, Cincinnati, Ohio, a corporation of Ohio Application December 24, 1931, Serial No. 583,008

8 Claims. (Cl. 77—27)

Various types of machine tools require, in their operation, the presence of fluid in substantially large quantities and that fluid frequently is required at some point remote from the machine base which heretofore frequently has been utilized as a reservoir for fluid.

One good example of the requirement of such fluid is the cooling and lubricating of the tool or other parts of the machine. Another example is the utilization of fluid, usually oil, for the actuation of some part of the machine, such, for example, as the feed of a drill spindle in a drilling machine. In machine tools in which the various parts are relatively fixed no great problem is encountered as fixed piping may be employed, whereas in machine tools where the parts are relatively movable considerable difficulty has been experienced in transporting the fluid from the reservoir to the point of use. Heretofore this has usually been accomplished by the employment of either flexible, jointed, or telescoping conduits extending from one machine element to another. It is usually impossible or impractical to conceal such conduits and, being exposed to view, are unsightly. Also they are frequently in the way of the operator. Furthermore, they are subject to leakage.

A radial drill is a good example of a machine tool in which difficulty of this nature heretofore has been experienced. A conventional radial drill comprises a base, a column, a radial arm movable vertically and swinging horizontally on the column, and a tool head translatable lengthwise of the arm, which, in some machines, is as great as twelve feet in length. As heretofore stated, liquid in relatively large quantities may be required at the drill head in all of its positions along the movable radial arm. For many years this liquid has been supplied to the head from a remote reservoir, usually in or adjacent the base of the machine, by means of flexible, jointed or telescoping conduits, as above described. More or less recently the difficulty was partially overcome by enlarging the translatable tool head and forming a fluid reservoir directly therein. Thus the supply of fluid was located adjacent its point of use and the necessity of flexible or other conduits connected with the head was obviated.

While this advance in the art was noteworthy it did not, however, entirely solve the problem. First, it necessitated the employment of a relatively large head. Second, the supply of oil was necessarily relatively small which obviously might result in undesirable heating of the oil. Third, it increased the weight of the head which is undesirable inasmuch as such increase in weight places a greater load on the arm, thereby tending to deflect it out of its horizontal position, especially when the head is adjusted to a position adjacent the outer end of the arm.

The present invention relates to machine tools and it has, as its primary object, to overcome the difficulties heretofore experienced in the supplying of fluid to an adjustably mounted element in all of the various positions thereof.

A more specific object of the invention is to provide an improved radial drill arm construction whereby a supply of fluid is available to the drill head in all of its positions of adjustment along the drill arm, and yet to avoid the employment of exposed, adjustable or flexible conduits.

A further object of the invention is to provide improved means for rendering available to a radial drill head, a relatively large supply of fluid in all of the positions of adjustment of the drill head along its supporting arm without increasing either the size or weight of the drill head.

These and other objects have been attained by so forming the member which supports the translatable element that the former may serve as a reservoir for actuating, or other, fluid. For convenience, this invention will be disclosed as embodied in a bracket type radial drill but it is to be understood that the invention is in nowise limited to that type of radial drill nor even to drilling machines generally.

In the embodiment of the invention disclosed, the radial drill arm is formed as a reservoir or sump holding a generous supply of oil adapted to be used for actuating an hydraulic motor whose office is to reciprocate the drill spindle.

Obviously, instead of containing actuating fluid, the reservoir could contain lubricant, coolant or fluid for any other purpose. Also the reservoir may be divided or partitioned to contain, at the same time, more than one kind of fluid.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Fig. 2 is a right end elevation of Fig. 1, with the arm in section better to show the reservoirs formed therein.

Fig. 3 is a side elevation of the improved arm.

Fig. 4 is a plan of Fig. 3 with a portion of the arm in section.

Fig. 5 is a section on the line 5—5 of Fig. 3.

Figure 1:
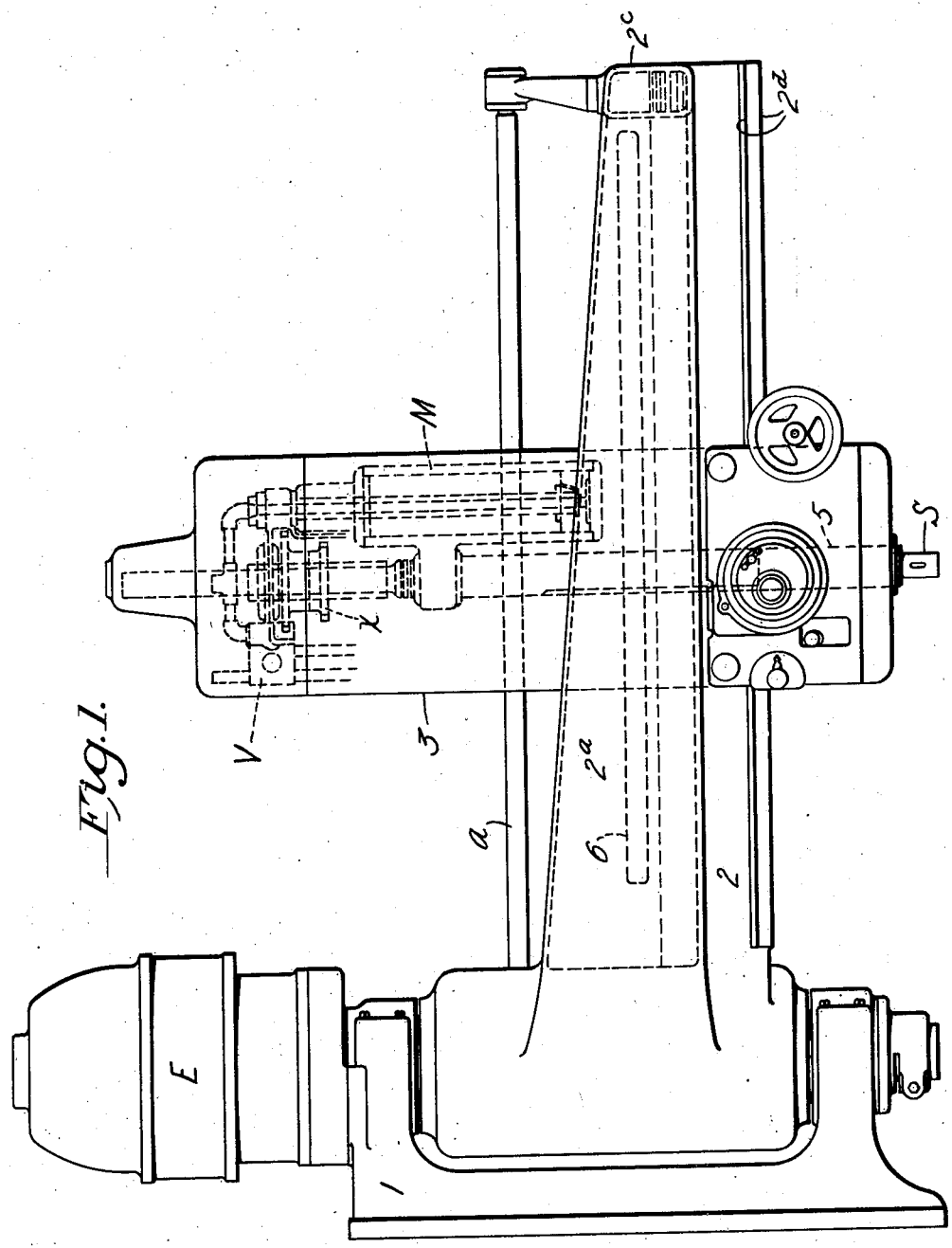
Figure 1 is a side elevation of a bracket type radial drill embodying the present invention.

Referring more specifically to the drawings the invention is disclosed as embodied in a radial drill comprising a supporting bracket 1, an arm 2 journaled thereon and a tool head 3 translatably mounted on the arm. Although the arm is shown as supported by a bracket it is to be understood that any other suitable support may be employed. For example, the conventional upright post and rotatable sleeve may be utilized to support the arm. The arm is preferably a unitary casting and is shown as divided longitudinally into two tubular portions $2^a$ and $2^b$ which are connected together at their outermost ends as shown at $2^c$, in Fig. 4. The tubular portions $2^a$ and $2^b$ are provided with guideways $2^d$ which support and guide the head 3 fitted therebetween. To render the head readily translatable on the arm it preferably carries rollers 4 which engage the upper of the guideways $2^d$.

An important feature of this invenition resides in the provision in the arm, of a reservoir, or reservoirs, for holding a generous supply of fluid to be used in or about the tool head in all of its positions of adjustment along the arm. This has been accomplished by forming cored chambers $2^e$ and $2^f$ in the portions $2^a$ and $2^b$. These chambers may be connected together by a cross chamber in the end portion $2^c$, as shown in Fig. 4, thereby forming a single reservoir or, if it is desired to utilize more than one fluid, they may be individual chambers. This latter readily may be effected by separating the chambers by a wall as indicated in dotted lines at $2^g$ in Fig. 4.

To give access to the fluid in the chambers $2^e$ and $2^f$, in all of the positions of the head on the arm, one wall of each chamber is formed with an aperture 6 which extends substantially the entire length of the arm. Preferably, these apertures are formed in the inner side wall of the chamber as they are there somewhat protected and, therefore, do not readily admit dirt or other foreign matter into the reservoirs.

To illustrate one utilization of this invention, the drill head 3 is shown as provided with a self-contained circulatory hydraulic system adapted to receive its supply of actuating oil from the reservoir in the arm and also adapted to discharge its exhaust oil thereinto. This hydraulic system comprises a reciprocating hydraulic motor M located within the tool head and connected to reciprocate the sleeve 5 and the spindle S journaled therein. A pump P, also carried by the tool head, is shown as having its intake line 7 extending through one of the apertures 6 and into the chamber $2^f$ to draw oil from the supply therein. From the pump the oil passes through conduit 8, through valve means V and thence to the motor M. Exhaust fluid from the motor M passes through conduit 9 which projects through the other aperture 6 into the chamber $2^e$. Thus it will be seen that this construction affords a generous and constant supply of fluid to the tool head in all of its positions along the arm.

The spindle S may be rotated by any suitable means, such, for example, as by an electric motor E, supported by the bracket 1, a shaft $a$ driven by the motor E and extending lengthwise of the arm and a driving connection, designated generally as $x$, within the tool head and including speed change gearing.

While this invention is described as providing a supply of actuating fluid for an hydraulic motor, it is to be understood that the invention is not limited to that particular use. Obviously, the reservoir in the arm advantageously may be utilized to contain lubricating oil, cutting compound or other fluid which may be required.

It is to be noted that the provision of such a generous quantity of fluid distributed throughout substantially the entire length of the arm will result in rapid dissipation of the heat generated by the operation of the hydraulic system. Thus a uniform working condition may be maintained, which is not possible where only a relative small quantity of fluid is available such, for example, as when the reservoir is carried by the drill head.

Other advantages derived from utilizing the arm as the reservoir rather than having the reservoir formed in the translatable member are that the member may be made smaller; is lighter in weight and, therefore, is more readily translatable; and does not exert objectionable deflection of the arm when the head is adjusted to the outer end thereof.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. In a radial drill, an arm; a tool-head translatably mounted on said arm and movable therealong; a fluid pressure system carried wholly by said tool-head; means, including an hydraulic motor, carried by said tool-head adapted to be actuated by said fluid pressure system; and a reservoir formed in said arm and adapted to supply fluid to the intake of said system and to receive fluid from the exhaust of said system in all of the positions of said tool-head on said arm.

2. In a radial drill, a supporting arm; a drill head translatably mounted on said arm and movable therealong; a pump carried by said drill head; a reservoir formed in said arm; an hydraulic motor carried by said drill head; an intake conduit connected with said pump and motor and having one end extending into said reservoir and adapted to draw fluid therefrom in all the positions of said element along its supporting member; and means to return to said reservoir the fluid discharged by said motor.

3. In a radial drill, an arm; a drill head mounted on said arm and movable therealong; a reciprocable spindle mounted in said head; an hydraulic motor connected to reciprocate said spindle; a pump carried by said drill head and adapted to supply fluid under pressure to actuate said hydraulic motor; an oil reservoir formed in said arm; said arm having an aperture in a wall thereof to give access to the oil in said reservoir, the length of said aperture being substantially the same as the distance which said drill head is adapted to be translated; a conduit carried by said head connected with said pump and motor and having one end projecting through said aperture into said reservoir and adapted to draw oil therefrom in all the positions of the head on said arm, and means to return to said reservoir the fluid discharged by said motor.

4. In a machine tool; an arm; a tool head translatably mounted on said arm and movable therealong; a fluid pressure system carried wholly by said head; means on said head adapted to be actuated by the pressure afforded by said system and a reservoir formed in said arm extending lengthwise thereof and adapted to supply fluid to the intake of said system and to receive fluid from the exhaust of said system in all of the positions of said head on said arm.

5. In a machine tool, a support having a relatively narrow slot extending lengthwise thereof; a member translatably mounted on said support and movable therealong; a reciprocable element carried by said member; an hydraulic motor carried by said member and connected to reciprocate said element; a pump carried by said translatable member adapted to provide fluid pressure to actuate said motor; a reservoir formed in said support and substantially coextensive therewith adapted to contain actuating fluid for said motor; a conduit connected with said pump and having one end extending through the slot in said support and into said reservoir to draw actuating fluid therefrom in all the positions of said member on said support; and means to return to said reservoir the fluid discharged by said motor.

6. In a machine tool, a support; a member translatably mounted thereon and movable therealong; an actuable element carried by said member; an hydraulic motor carried by said member and connected to actuate said element; a pump carried by said translatable member adapted to provide fluid pressure to actuate said element; a reservoir formed in said support and substantially coextensive therewith, adapted to contain actuating fluid for said motor, said reservoir having an aperture in a wall thereof the length of which is substantially the same as the distance which said member is translatable on said support; a conduit connected with said pump and having one end projecting through said aperture into said reservoir to draw actuating fluid therefrom in all of the positions of said member on said support; and means to return to the reservoir the fluid discharged by said motor.

7. In a machine tool, an arm, a tool head mounted on said arm and movable therealong; a tool spindle mounted in said head; an hydraulic motor connected to actuate said spindle; a pump carried by said tool head and adapted to supply fluid under pressure to actuate said hydraulic motor; an oil reservoir formed in said arm, said arm having an aperture in a wall thereof to give access to the oil in said reservoir, the length of said aperture being substantially the same as the distance which said tool head is adapted to be translated; a conduit carried by said head connected with said pump and motor and having one end projecting through said aperture and adapted to draw oil from said reservoir in all the positions of the head on said arm; and means to return to said reservoir the fluid discharged by said motor.

8. In a machine tool, an arm; a head mounted on said arm and movable therealong; an element movably mounted in said head; an hydraulic motor carried by said head and connected to actuate said movable element; a pump carried by said head and adapted to supply fluid under pressure to actuate said hydraulic motor; an oil reservoir formed in said arm and extending the major portion of the length thereof; a conduit connected with said pump and extending into said reservoir to supply fluid to said pump in all of the positions of said head along said arm; and means to return to said reservoir the fluid discharged by said motor.

LAWRENCE LEE SCHAUER.